(12) United States Patent
Lindman et al.

(10) Patent No.: US 11,874,716 B2
(45) Date of Patent: *Jan. 16, 2024

(54) EMBEDDED COMPUTING DEVICE MANAGEMENT

(71) Applicant: Amer Sports Digital Services Oy, Vantaa (FI)

(72) Inventors: Erik Lindman, Vantaa (FI); Jyrki Uusitalo, Vantaa (FI); Timo Eriksson, Vantaa (FI); Jari Akkila, Vantaa (FI); Michael Miettinen, Vantaa (FI); Niko Knappe, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,143

(22) Filed: Dec. 18, 2018

(65) Prior Publication Data
US 2019/0114204 A1 Apr. 18, 2019

Related U.S. Application Data

(63) Continuation-in-part of application No. 15/784,234, filed on Oct. 16, 2017, now Pat. No. 11,145,272,
(Continued)

(30) Foreign Application Priority Data

Aug. 5, 2015 (FI) .................................. 20155573
Aug. 14, 2015 (GB) .................................. 1514449
(Continued)

(51) Int. Cl.
*G06F 1/3206* (2019.01)
*G06F 9/50* (2006.01)
(Continued)

(52) U.S. Cl.
CPC .......... *G06F 1/3206* (2013.01); *G06F 1/3209* (2013.01); *G06F 1/3275* (2013.01);
(Continued)

(58) Field of Classification Search
None
See application file for complete search history.

(56) References Cited

U.S. PATENT DOCUMENTS 5,924,980 A 7/1999 Coetzee
7,721,118 B1 5/2010 Tamasi et al.
(Continued)

FOREIGN PATENT DOCUMENTS

AU 2007216704 A1 4/2008
CM 106062661 A 10/2016
(Continued)

OTHER PUBLICATIONS

ARM big. LITTLE. Wikipedia, The free encyclopedia, Oct. 11, 2018, Retrieved on May 28, 2020 from: <https://en.wikipedia.org/w/index.php?title=ARM_bit.LITTLE&oldid=863559211> foreword on p. 1, section "Run-state migration" on pp. 1-2.
(Continued)

*Primary Examiner* — Parul H Gupta
(74) *Attorney, Agent, or Firm* — Laine IP Oy

(57) ABSTRACT

According to an example aspect of the present invention, there is provided apparatus comprising at least one processing core, at least one memory including computer program code, the at least one memory and the computer program code being configured to, with the at least one processing core, cause the apparatus at least to cause the apparatus to predict, based at least in part on a calendar application, a need for a rich media interface and to trigger startup of a higher capability processing device from among a low capability processing device and the higher capability pro-
(Continued)

cessing device in the apparatus at a time that is selected based on the prediction.

19 Claims, 11 Drawing Sheets

Related U.S. Application Data which is a continuation-in-part of application No. 15/229,146, filed on Aug. 5, 2016, now Pat. No. 10,168,669.

(30) Foreign Application Priority Data

Oct. 17, 2016 (FI) ..................................... 20165790
Oct. 17, 2016 (GB) ..................................... 1617575

(51) Int. Cl.
| | |
|---|---|
| G06F 1/3234 | (2019.01) |
| G06F 1/3293 | (2019.01) |
| G06F 1/3287 | (2019.01) |
| G06F 9/54 | (2006.01) |
| G06F 3/04883 | (2022.01) |
| G06F 1/3209 | (2019.01) |
| G06Q 10/109 | (2023.01) |

(52) U.S. Cl.
CPC .......... *G06F 1/3287* (2013.01); *G06F 1/3293* (2013.01); *G06F 3/04883* (2013.01); *G06F 9/5044* (2013.01); *G06F 9/544* (2013.01); *G06Q 10/109* (2013.01)

(56) References Cited

U.S. PATENT DOCUMENTS

| | | | |
|---|---|---|---|
| 8,848,058 B2 | 9/2014 | Ayer et al. | |
| 9,079,090 B2 | 7/2015 | Hohteri | |
| 9,222,787 B2 | 12/2015 | Blumenberg et al. | |
| 9,595,187 B2 | 3/2017 | Kotz et al. | |
| 10,135,905 B2 | 11/2018 | Chaudhri et al. | |
| 10,295,556 B1 | 5/2019 | Paczkowski et al. | |
| 10,415,990 B2 | 9/2019 | Cho et al. | |
| 2003/0038831 A1 | 2/2003 | Engelfriet | |
| 2003/0109287 A1 | 6/2003 | Villaret | |
| 2005/0086405 A1 | 4/2005 | Kobayashi et al. | |
| 2006/0068812 A1 | 3/2006 | Carro et al. | |
| 2008/0052493 A1 | 2/2008 | Chang | |
| 2008/0158117 A1 | 7/2008 | Wong et al. | |
| 2008/0294663 A1 | 11/2008 | Heinley et al. | |
| 2009/0094557 A1 | 4/2009 | Howard | |
| 2009/0100332 A1* | 4/2009 | Kanjilal | G06Q 10/109 715/234 |
| 2009/0265623 A1 | 10/2009 | Kho et al. | |
| 2010/0167712 A1 | 7/2010 | Stallings et al. | |
| 2010/0257014 A1 | 10/2010 | Roberts et al. | |
| 2010/0313042 A1 | 12/2010 | Shuster | |
| 2011/0252351 A1 | 10/2011 | Sikora et al. | |
| 2011/0283224 A1 | 11/2011 | Ramsey et al. | |
| 2011/0296312 A1 | 12/2011 | Boyer et al. | |
| 2011/0307723 A1 | 12/2011 | Cupps et al. | |
| 2012/0100895 A1 | 4/2012 | Priyantha et al. | |
| 2012/0109518 A1 | 5/2012 | Huang | |
| 2012/0158289 A1 | 6/2012 | Bernheim Brush et al. | |
| 2013/0151874 A1 | 6/2013 | Parks et al. | |
| 2013/0166888 A1* | 6/2013 | Branson | G06F 9/30 712/220 |
| 2013/0289932 A1 | 10/2013 | Baechler et al. | |
| 2013/0304377 A1 | 11/2013 | Van Hende | |
| 2013/0312043 A1 | 11/2013 | Stone et al. | |
| 2014/0135593 A1 | 5/2014 | Jayalth et al. | |
| 2014/0149754 A1* | 5/2014 | Silva | G06F 3/0304 713/300 |
| 2014/0156084 A1 | 6/2014 | Rahman et al. | |
| 2014/0159915 A1 | 6/2014 | Hong et al. | |
| 2014/0164811 A1 | 6/2014 | Molettiere et al. | |
| 2014/0208333 A1 | 7/2014 | Beals et al. | |
| 2014/0300490 A1 | 10/2014 | Kotz et al. | |
| 2014/0337036 A1 | 11/2014 | Haiut et al. | |
| 2014/0365107 A1 | 12/2014 | Dutta et al. | |
| 2015/0127966 A1 | 5/2015 | Ma et al. | |
| 2015/0185815 A1 | 7/2015 | Debates et al. | |
| 2015/0233595 A1 | 8/2015 | Fadell et al. | |
| 2015/0312857 A1 | 10/2015 | Kim et al. | |
| 2015/0317801 A1 | 11/2015 | Bentley et al. | |
| 2015/0334772 A1 | 11/2015 | Wong et al. | |
| 2015/0347983 A1 | 12/2015 | Jon et al. | |
| 2015/0362519 A1 | 12/2015 | Balakrishnan et al. | |
| 2016/0012294 A1 | 1/2016 | Bouck | |
| 2016/0018899 A1 | 1/2016 | Tu et al. | |
| 2016/0026236 A1 | 1/2016 | Vasistha et al. | |
| 2016/0034043 A1 | 2/2016 | Le Grand et al. | |
| 2016/0034133 A1* | 2/2016 | Wilson | G06F 3/0488 715/772 |
| 2016/0041593 A1 | 2/2016 | Dharawat | |
| 2016/0081028 A1 | 3/2016 | Chang et al. | |
| 2016/0105852 A1 | 4/2016 | Papakipos et al. | |
| 2016/0148615 A1 | 5/2016 | Lee et al. | |
| 2016/0209907 A1 | 7/2016 | Han et al. | |
| 2016/0327915 A1 | 11/2016 | Katzer et al. | |
| 2016/0328991 A1 | 11/2016 | Simpson et al. | |
| 2016/0367202 A1 | 12/2016 | Carter et al. | |
| 2016/0379547 A1 | 12/2016 | Okada | |
| 2017/0010677 A1 | 1/2017 | Roh et al. | |
| 2017/0011210 A1 | 1/2017 | Cheong et al. | |
| 2017/0032256 A1 | 2/2017 | Otto et al. | |
| 2017/0043212 A1 | 2/2017 | Wong et al. | |
| 2017/0124517 A1 | 5/2017 | Martin | |
| 2017/0153693 A1 | 6/2017 | Duale et al. | |
| 2017/0168555 A1 | 6/2017 | Munoz et al. | |
| 2017/0209743 A1 | 7/2017 | Bengtsson et al. | |
| 2017/0228091 A1 | 8/2017 | Ogita | |
| 2017/0340221 A1 | 11/2017 | Cronin et al. | |
| 2018/0040290 A1 | 2/2018 | Liu et al. | |
| 2019/0025928 A1 | 1/2019 | Pantelopoulos et al. | |
| 2019/0056777 A1 | 2/2019 | Munoz et al. | |
| 2019/0069244 A1 | 2/2019 | Jeon et al. | |
| 2019/0282857 A1 | 9/2019 | Hapola et al. | |
| 2019/0367143 A1 | 12/2019 | Sinclair et al. | |

FOREIGN PATENT DOCUMENTS

| | | |
|---|---|---|
| CN | 102495756 A | 6/2012 |
| CN | 103309428 A | 9/2013 |
| CN | 103631359 A | 3/2014 |
| CN | 103970271 A | 8/2014 |
| CN | 105706093 A | 6/2016 |
| CN | 106170247 A | 11/2016 |
| CN | 106604369 A | 4/2017 |
| CN | 106984025 A | 7/2017 |
| CN | 106999106 A | 8/2017 |
| CN | 108052272 A | 5/2018 |
| CN | 108983873 A | 12/2018 |
| EP | 2098165 A1 | 9/2009 |
| EP | 2703945 A2 | 3/2015 |
| EP | 2996409 A1 | 3/2016 |
| EP | 3018582 A2 | 5/2016 |
| EP | 3023859 A1 | 5/2016 |
| EP | 3361370 A | 8/2018 |
| GB | 2537423 A | 10/2016 |
| GB | 2555107 A | 4/2018 |
| WO | WO 02054157 A1 | 7/2002 |
| WO | WO2011061412 A1 | 5/2011 |
| WO | WO2012037637 A1 | 3/2012 |
| WO | WO2012115943 A1 | 8/2012 |
| WO | WO2014193672 A1 | 12/2014 |
| WO | WO2014209697 A1 | 12/2014 |
| WO | WO2015021407 A1 | 2/2015 |
| WO | WO 2014182162 A3 | 6/2015 |
| WO | WO 2016022203 A1 | 2/2016 |

(56) References Cited

FOREIGN PATENT DOCUMENTS

WO     WO2016037012 A1     3/2016
WO     WO2018222936 A1     12/2018

OTHER PUBLICATIONS

Qualcomm Snapdragon Wear 3100 Platform Supports New Ultra-Low Power System Architecture For Next Generation Smartwatches. Qualcomm Technologies, Inc., Sep. 10, 2018, Retrieved on May 28, 2020 from: <https://www.qualcomm.com/news/releases/2018/09/10/qualcomm-snapdragon-wear-3100-platform-supports-new-ultra-low-power-system> sections "Snapdragon Wear 3100 Based Smartwatches Aim to Enrich the User Experience" on pp. 3-4.

Ainsworth et al: Parallel Error Detection Using Heterogeneous Cores. 48th Annual IEEE/IFIP International Conference on Dependable Systems and Networks (DSN), 2018, IEEE, 2018.

Davis: The Best Technical Diving Computers 2019. Feb. 7, 2019.

\* cited by examiner

EMBEDDED COMPUTING DEVICE MANAGEMENT

FIELD

The present invention relates to the field of user devices, such as implementing multi-core or multi-chip embedded solutions.

BACKGROUND

A user interface, UI, enables a user to interact with a device, such as, for example, a car, a smartphone, an automated banking device or an aircraft control system. Different user interfaces are appropriate for different purposes, for example, where the user uses the device to perform actions that set persons at risk, the quality and quantity of information presented to the user when interacting with the user interface must be sufficient to enable use of the device safely.

User interfaces may be based on presenting information to the user, and receiving inputs from the user. Information may be presented using an output device such as a display, for example an organic light-emitting diode, OLED, display. Inputs may be received from the user via various input devices, such as touchscreen displays, push buttons, microphones arranged to capture the user's speech and/or levers the user can pull.

A traditional user interface of a wristwatch comprises a long and a short arm, which rotate over a watch dial to indicate the time of day. Digital wrist watches may comprise, for example, a liquid crystal display, LCD, type display indicating the time of day numerically.

A smart watch may comprise a touchscreen, such that the display portion of the touchscreen acts as an output device of the user interface and the touch sensitive portion of the touchscreen acts as an input device of the user interface. Using a smart watch presents challenges, since useful applications tend to require larger screens to present a useful quantity of information using a font large enough, that users can read it without magnifying devices.

Calendar applications facilitate planning of meetings, travel and resources. Typically, a user accesses a calendar application using a personal computer with a large screen, for example via a Linux or Windows operating system. The user may then see, for example, an entire work week at a glance.

Embedded devices generally comprise objects that contain an embedded computing system, which may be enclosed by the object. The embedded computer system may be designed with a specific use in mind, or the embedded computer system may be at least in part general-purpose in the sense that a user may be enabled to install software in it. An embedded computer system may be based on a microcontroller or microprocessor CPU, for example.

Embedded devices may comprise one or more processors, user interfaces and displays, such that a user may interact with the device using the user interface. The user interface may comprise buttons, for example. An embedded device may comprise a connectivity function configured to communicate with a communications network, such as, for example, a wireless communications network. The embedded device may be enabled to receive from such a communications network information relating to, for example, a current time and current time zone.

More complex embedded devices, such as cellular telephones, may allow a user to install applications into a memory, such as, for example, a solid-state memory, comprised in the device. Embedded devices are frequently resource-constrained when compared to desktop or laptop computers. For example, memory capacity may be more limited than in desktop or laptop computers, processor computational capacity may be lower and energy may be available from a battery. The battery, which may be small, may be rechargeable.

Conserving battery power is a key task in designing embedded devices. A lower current usage enables longer time intervals in-between battery charging. For example, smartphones benefit greatly when they can survive an entire day before needing recharging, since users are thereby enabled to recharge their phones overnight, and enjoy uninterrupted use during the day.

Battery resources may be conserved by throttling a processor clock frequency between a maximum clock frequency and a lower clock frequency, for example one half of the maximum clock frequency. Another way to conserve battery power is to cause a display of an embedded device to switch itself off then the device is not used, since displaying content on a display consumes energy in order to cause the display to emit light that humans can see.

SUMMARY OF THE INVENTION

The invention relates in general to a user interface for presenting sunrise and sunset time in a new way.

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to cause the apparatus to predict, based at least in part on a calendar application, a need for a rich media interface and to trigger startup of a higher capability processing device from among a low capability processing device and the higher capability processing device in the apparatus at a time that is selected based on the prediction.

According to a second aspect of the present invention, there is provided a method comprising causing the apparatus to predict, based at least in part on a calendar application, a need for a rich media interface, and triggering startup of a higher capability processing device from among a low capability processing device and the higher capability processing device in the apparatus at a time that is selected based on the prediction.

According to a third aspect of the present invention, there is provided a non-transitory computer readable medium having stored thereon a set of computer readable instructions that, when executed by at least one processor, cause an apparatus to at least cause the apparatus to predict, based at least in part on a calendar application, a need for a rich media interface, and trigger startup of a higher capability processing device from among a low capability processing device and the higher capability processing device in the apparatus at a time that is selected based on the prediction.

According to a fourth aspect of the present invention, there is provided a computer program configured to cause a method in accordance with the second aspect to be performed, when run on a processing device.

EMBODIMENTS

Figure 1A:
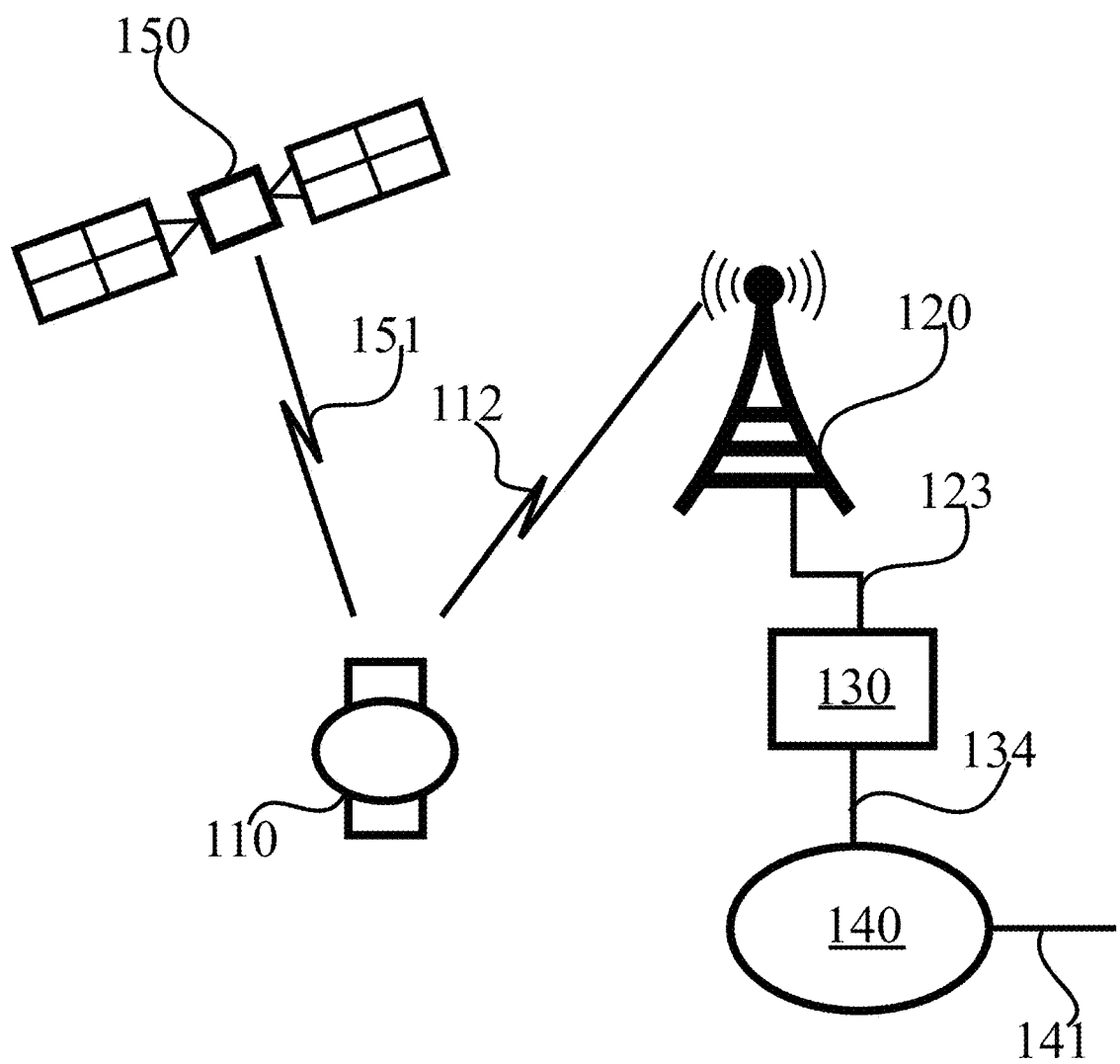
FIG. 1A illustrates a system in accordance with at least some embodiments of the present invention.

By presenting information along a time axis, a device can allow a user to glean locally and temporally relevant information from a limited-size screen. In detail, a user can scroll along the time axis to see past and/or future events, which may originate in a calendar application or the natural world surrounding him. Combining an indication of a sunset or sunrise to the time axis enables the user to plan his activities with regard to available natural light. The time axis provides a conceptually efficient classification method that enables presenting on the limited-size screen only the information the user is presently interested in.

Furnishing an embedded device with two or more processor cores, at least some of which are enabled to control the display of the device, makes possible power savings where a less-capable processor core is configured to toggle a more capable processor core to and from a hibernation state. A hibernation state may comprise that a clock frequency of the more capable processing core is set to zero, for example. In a hibernation state, in addition to, or alternatively to, setting the clock frequency of the more capable processing core to zero, a memory refresh rate of memory used by the more capable core may be set to zero. Alternatively to zero, a low non-zero frequency may be used for the clock frequency and/or the memory refresh frequency. In some embodiments, a more capable processing core may employ a higher-density memory technology, such as double data rate, DDR, memory, and a less capable processing core may employ a lower-density memory technology, such as static random access memory, SRAM, memory. In a hibernation state the hibernated processing core, or more generally processing unit, may be powered off. Alternatively to a processor core, an entire processor may, in some embodiments, be transitioned to a hibernation state. An advantage of hibernating an entire processor is that circuitry in the processor outside the core is also hibernated, further reducing current consumption.

An apparatus may predict, based at least in part on a calendar application, a need for a rich media interface and to trigger startup of a higher capability processing device from among a low capability processing device and the higher capability processing device in the apparatus at a time that is selected based on the prediction. The prediction may be based on a specific calendar event in the calendar application, the specific calendar event comprising an indication relating to an application used to process the calendar event. The prediction may comprise comparing the indication relating to the application to a list of applications and their associated media requirements, such that when a media requirement of an application needed to process the specific calendar event cannot be fulfilled by the low capability processing device, the higher capability processing device is triggered. The triggering may take place at a time before a start time of the calendar event, the time being selected such that, in accordance with the list, the higher capability processing device has time to start up and to start the application in time for the start time. Thus the triggering may precede the start time of the specific calendar event by a lag which equals a sum of a boot time of the higher capability processing device and a starting delay of the application in the higher capability processing device. Thus the application would be available on the higher capability processing device at the right time, and not too soon, which would waste resources. The starting delay of the application in the higher capability processing device may be recorded on the list of applications and their associated media requirements, for example. The list may be updated as new applications are installed, and their starting delays may be experimentally determined by the apparatus, without user intervention, at a time when the user is not using the apparatus.

FIG. 1 illustrates a system in accordance with at least some embodiments of the present invention. The system comprises device 110, which may comprise, for example, a smart watch, digital watch, smartphone, phablet device, tablet device, or another type of suitable device. Device 110 comprises a display, which may comprise a touchscreen display, for example. The display may be limited in size. Device 110 may be powered, for example, by a rechargeable battery. An example of a limited-size display is a display worn on a wrist.

Device 110 may be communicatively coupled with a communications network. For example, in FIG. 1 device 110 is coupled, via wireless link 112, with base station 120. Base station 120 may comprise a cellular or non-cellular base station, wherein a non-cellular base station may be referred to as an access point. Examples of cellular technologies include wideband code division multiple access, WCDMA, and long term evolution, LTE, while examples of non-cellular technologies include wireless local area network, WLAN, and worldwide interoperability for microwave access, WiMAX. Base station 120 may be coupled with network node 130 via connection 123. Connection 123 may be a wire-line connection, for example. Network node 130 may comprise, for example, a controller or gateway device. Network node 130 may interface, via connection 134, with network 140, which may comprise, for example, the Internet or a corporate network. Network 140 may be coupled with further networks via connection 141. In some embodiments, device 110 is not configured to couple with base station 120.

Device 110 may be configured to receive, from satellite constellation 150, satellite positioning information via satellite link 151. The satellite constellation may comprise, for example the global positioning system, GPS, or Galileo constellation. Satellite constellation 150 may comprise more than one satellite, although only one satellite is illustrated in FIG. 1 for the same of clarity. Likewise, receiving the positioning information over satellite link 151 may comprise receiving data from more than one satellite.

In embodiments where device 110 is not enabled to receive data from a satellite constellation, device 110 may obtain positioning information by interacting with a network in which base station 120 is comprised. For example, cellular networks may employ various ways to position a device, such as trilateration, multilateration or positioning based on an identity of a base station with which attachment is possible. Likewise a non-cellular base station, or access point, may know its own location and provide it to device 110, enabling device 110 to position itself within communication range of this access point.

Device 110 may be configured to obtain a current time from satellite constellation 150, base station 120 or by requesting it from a user, for example. Once device 110 has the current time and an estimate of its location, device 110 may consult a look-up table, for example, to determine how much time is remaining to sunset, and/or sunrise.

Device 110 may be configured to determine the sunset time and/or sunrise time, and to obtain event information from a calendar application. Device 110 may further be configured to present to the user a representation of at least some of these events, arranged relative to a time axis to enable the user to understand how calendar events relate to each other and to sunset and/or sunrise. This way, the user can proceed to complete tasks during daylight hours, for example. Using the time axis, or timeline, enables presenting the relevant information to the user from a limited-size screen in a time-ordered way.

Figure 1B:
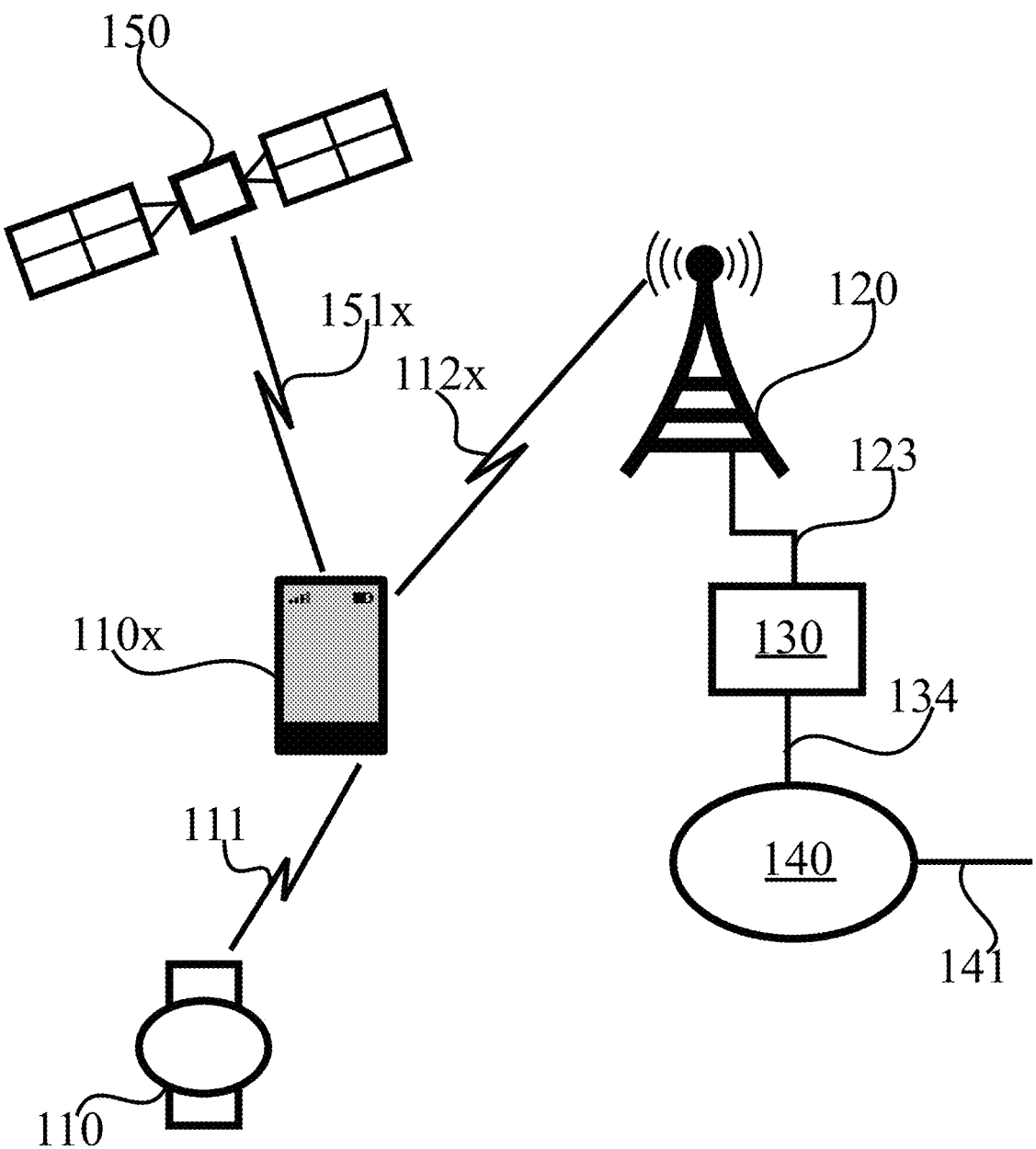
FIG. 1B illustrates a system in accordance with at least some embodiments of the present invention.

FIG. 1B illustrates a system in accordance with at least some embodiments of the present invention. Like numbering denotes like structure as in FIG. 1A. FIG. 1B embodiments comprise an auxiliary device 110x.

Device 110 may be communicatively coupled, for example communicatively paired, with an auxiliary device 110x. The communicative coupling, or pairing, is illustrated in FIG. 1 as interface 111, which may be wireless, as illustrated, or wire-line, depending on the embodiment. Auxiliary device 110x may comprise a smartphone, tablet computer or other computing device, for example. Auxiliary device 110x may comprise a device that the owner of device 110 uses to consume media, communicate or interact with applications. Auxiliary device 110x may be furnished with a larger display screen than device 110, which may make auxiliary device 110x preferable to the user when a complex interaction with an application is needed, as a larger screen enables a more detailed rendering of interaction options. In some embodiments, such as those illustrated in FIG. 1A, auxiliary device 110x is absent.

In some embodiments, where auxiliary device 100x is present, device 110 is configured to use connectivity capability of auxiliary device 110x. For example, device 110 may access a network via auxiliary device 110x. In these embodiments, device 110 need not be furnished with connectivity toward base station 120, for example, since device 110 may access network resources via interface 111 and a connection auxiliary device 110x has with base station 120. Such a connection is illustrated in FIG. 1B as connection 112x. For example, device 110 may comprise a smart watch and auxiliary device 110x may comprise a smartphone, which may have connectivity to cellular and/or non-cellular data networks. Likewise, in some embodiments device 110 may receive satellite positioning information, or positioning information derived therefrom, via auxiliary device 110x where device 110 lacks a satellite positioning receiver of its own. A satellite connection of auxiliary device 151x is illustrated in FIG. 1B as connection 151X.

In some embodiments, device 110 may have some connectivity and be configured to use both that and connectivity provided by auxiliary device 110x. For example, device 110 may comprise a satellite receiver enabling device 110 to obtain satellite positioning information directly from satellite constellation 150. Device 110 may then obtain network connectivity to base station 120 via auxiliary device 110x.

Figure 2:
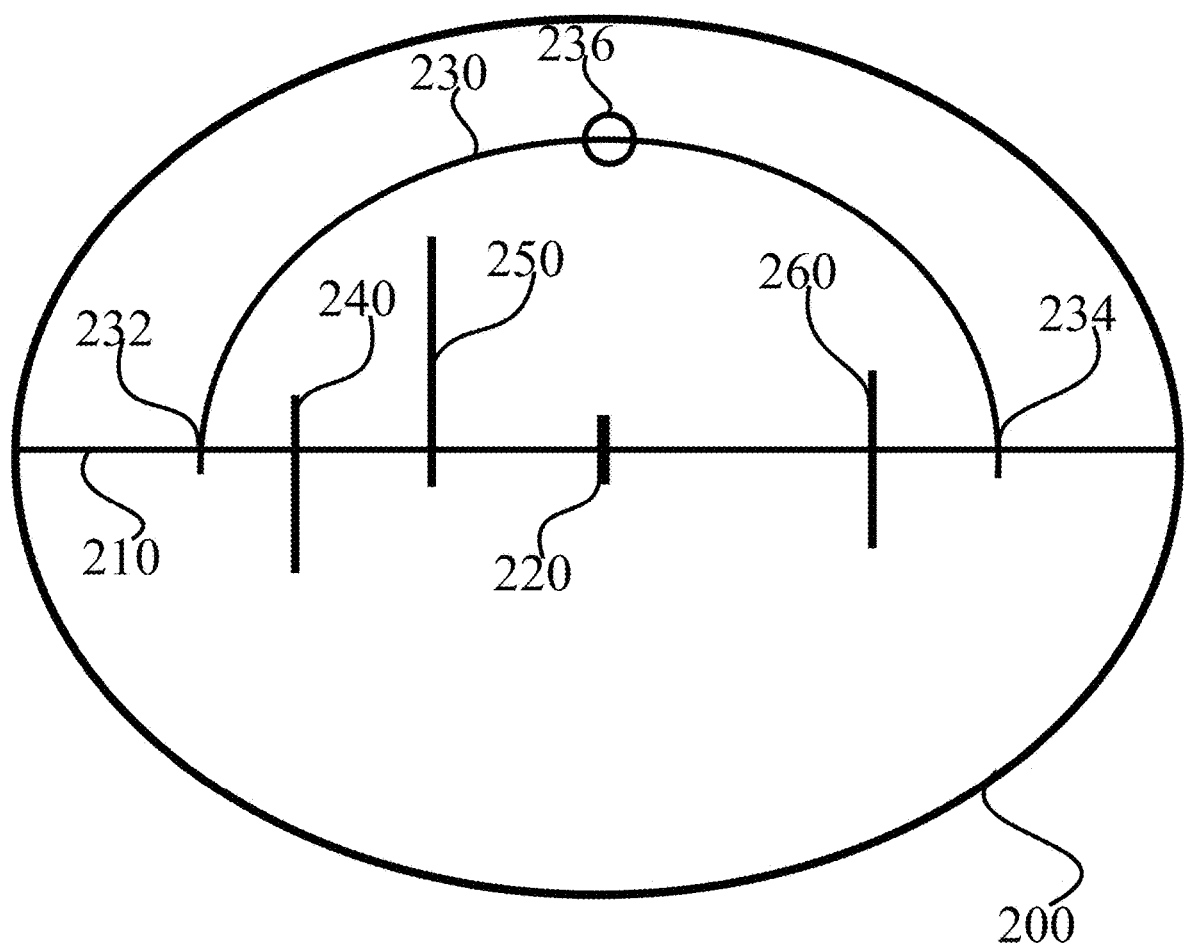
FIG. 2 illustrates a user interface in accordance with at least some embodiments of the present invention.

FIG. 2 illustrates a user interface in accordance with at least some embodiments of the present invention. Display 200 may comprise a display that is comprised in device 110 of FIG. 1, for example. On display 200 is displayed a time axis 210, which may be referred to as a timeline. In the middle of the timeline is a current time indicator 220. Current time indicator 220 is optional. The shape of display 200 need not be the same shape as that illustrated in FIG. 2.

Events are represented along the timeline by symbols 240, 250 and 260. Each of symbols 240, 250 and 260 corresponds to a calendar event or a dynamic event, such that the time when the event occurs determines the place on, or relative to, the timeline where the corresponding symbol is displayed. For example, in FIG. 2, the events denoted by symbols 240 and 250 have already taken place, and the event corresponding to symbol 260 will take place in the future. The user interface may communicate with a calendar application, to obtain therefrom information characterizing the calendar events to enable their representation along the timeline as symbols. Naturally, the number of events need not be three as illustrated in FIG. 2, but the number of events is dependent on dynamic and calendar input.

Represented along the time axis 210 is the sunrise time 232 and the sunset time 234. In various embodiments, either the sunrise time or the sunset time may be omitted from the user interface. Optionally, an arc 230 may be illustrated, representing the route of the Sun in the sky. The position of the Sun 236 may be represented along the arc. Alternatively or additionally, a position or phase of the Sun may be represented close to time indicator 220, or in another suitable way. Device 110 may determine the sunrise time and sunset time based on the positioning information and a table stored in a memory that device 110 may access, for example.

Device 110, running the user interface illustrated in FIG. 2, may be configured to enable a user to scroll along the timeline, for example by providing a swiping interaction to a touchscreen used to display the user interface. Likewise, the user may be enabled to zoom in and/or out, for example by providing a pinching interaction to a touchscreen used to display the user interface. Another possibility to scroll and/or zoom the user interface is a rotatable hardware element provided in device 110. For example, a rotatable hardware element may be partially retractable, such that when the hardware element is unretracted, rotating it provides a scrolling interaction with the user interface, and when retracted, rotating it provides a zooming interaction with the user interface. This kind of interaction may be suitable to small screen sizes, where the user's fingers may be of a similar size to the screen. An example rotatable hardware element has been described in the U.S. patent application Ser. No. 12/650,303, published as US2010/0187074.

Device 110 may be configured to determine at least one dynamic event. A dynamic event comprises an event that occurs at a time which depends on the location of device 110. A dynamic event may occur at a time which depends on the location of device 110 together with a location of a predefined location. The predefined location may comprise, for example, a point of interest. The predefined location may be defined by the user. The predefined location may comprise, for example, the user's home, a base camp, a hotel, a hospital or another kind of location. For example, device 110 may determine a time, when the user needs to start walking, cycling or driving toward the predefined location, such that the user will arrive in the predefined location before sunset. To enable device 110 to determine this time, device 110 may know, from the positioning information and, for example, a look-up table stored in device 110, the sunset time. Device 110 may then determine a route from the current position of device 110 to the predefined location, and determine the length of the route. Device 110 may determine the route based, at least in part, on an interaction with a mapping application. The time needed to traverse the route, the traverse time, can then be determined based on a movement speed of the user, which device 110 may be pre-configured with, or which device 110 may determine from past behaviour of the user. The time of the dynamic event may then be determined as preceding the sunset time by the traverse time.

Alternatively to sunset, the dynamic event may be determined based on a meteorological event, for example rain. To enable this, device 110 may obtain a locally relevant weather forecast and use it instead of the sunset time, to deduce when the user needs to start toward the predefined location. As a further example, a dynamic event may be based on a time of departure of a public transport, such as a train or aircraft, for example. Thus the user may be provided with a visual indication of how long he has before he needs to start toward a train station or airport.

Device 110 may be configured to sound an alarm, or cause a vibrating or other kind of indication to be provided to a user, for example, triggered by a dynamic event. Thus safety of persons roaming in nature may be enhanced, as they are warned to start toward the predefined location in time to get there before dark, rain, or another event.

While FIG. 2 illustrates a view into the user interface where the sunrise and sunset are both visible, a zoomed and/or scrolled view may display only one of these, or indeed neither in case the view is zoomed to a section of the timeline that falls between sunrise and sunset. In general, an indication as to a position or phase of the sun may be provided, to enable a user to know how long it will be until sunset or sunrise. Such an indication may take the form of the arc 230, an angle or tangent or another kind of suitable indication.

The user may select a symbol, such as symbol 250, and interact with it to cause device 110 to perform an action that relates to the calendar event that corresponds to symbol 250. For example, device 110 may cause details, such as location, attendees or duration, of the calendar event to be displayed onscreen as a response to the user touching symbol 250, or indeed another symbol. The details may be displayed below the timeline in the timeline view, or alternatively the timeline view may be replaced with the details, for example for five or ten seconds. In some embodiments, the user is enabled to interact with an application that relates to the calendar event. For example, the user may participate in a conference call by interacting with symbol 250, and then with a further user interface element that is displayed, for example along with the details, as a response to the user touching symbol 250.

When the user interacts with a symbol corresponding to a dynamic event, the user may be presented with information concerning the dynamic event, such as, for example, a map with the determined route displayed, or instructions concerning how to get to the predefined location.

Device 110 may be configured to detect a device context. For example, device 110 may detect that the user is at work, or interacting with work programs, responsive to which device 110 may cause work-related calendar events to be represented in the timeline user interface. For example, in case the user is at work, non-work related calendar events may be suppressed, by which it is meant that symbols corresponding to them are not displayed in the user interface. As another example, when the user is moving around downtown, dynamic events that relate to public transport may be represented in the user interface. As a yet further example, when the user is roaming in nature, dynamic events relating to sunset or rain may be represented, and work-related events suppressed. In general, in-context events may be represented in the user interface, while out-of-context events may be suppressed and not represented graphically in the user interface.

Device 110 may be configured to detect the device context autonomously, and to suppress the out-of-context dynamic events and/or calendar events without user input. The user may, using a user interface interaction element, override the suppressing to view all calendar and/or dynamic events on the timeline, or to re-configure to device context in case device 110 has detected the device context incorrectly. An advantage of such suppressing is that in a limited-size screen device, the screen is used to display more relevant information, and less relevant information, which would clutter the view, is not displayed.

Device 110 may be configured to provide a display in at least two modes, a reduced media mode and a rich media mode. The reduced media mode may be renderable by a low-capacity processing device in device 110, while the rich media mode may require device 110 to activate a high-capacity processing device in device 110. The high-capacity processing device may consume more battery resources than the low-capacity processing device. Device 110 may be configured to predictively activate the high-capacity processing device as a response to a determination that a calendar event the handling of which will require the rich media mode will soon occur.

Figure 3:
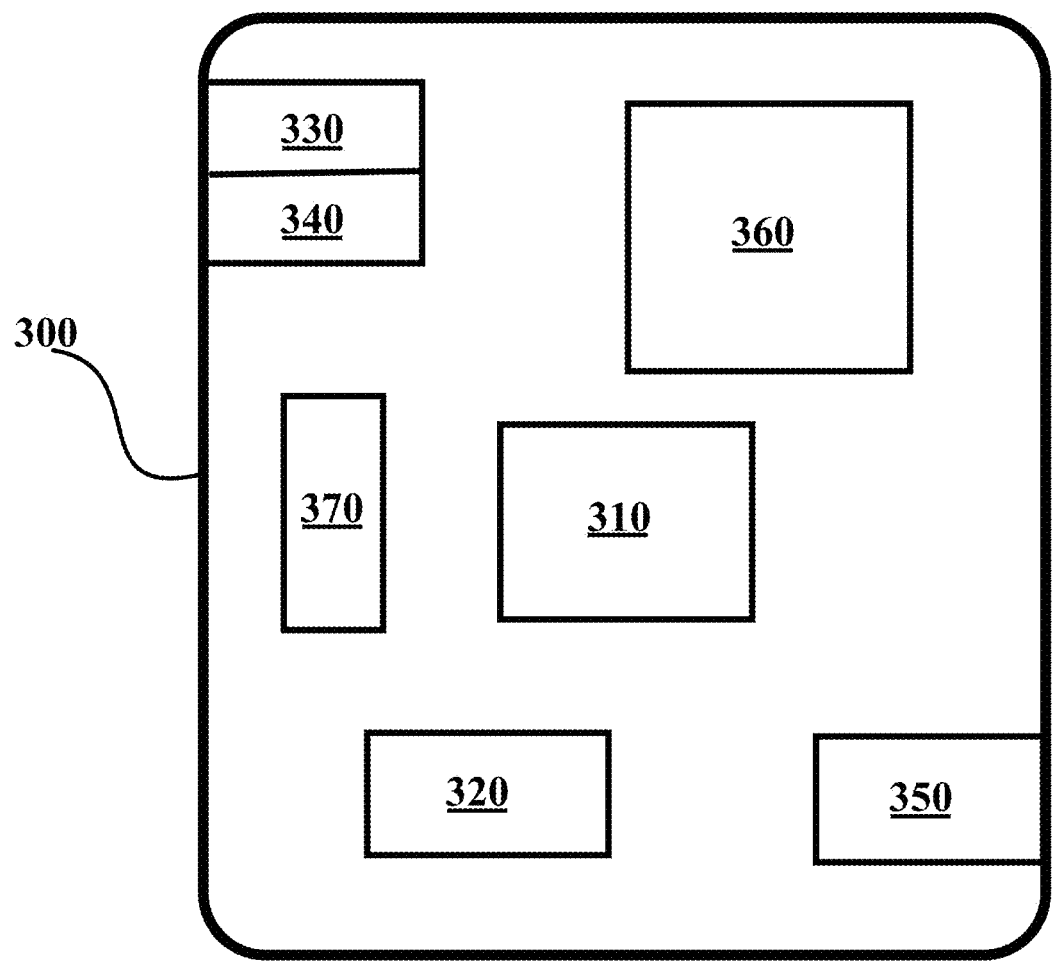
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, an embedded device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor or processing unit. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to interact with a time axis based view.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
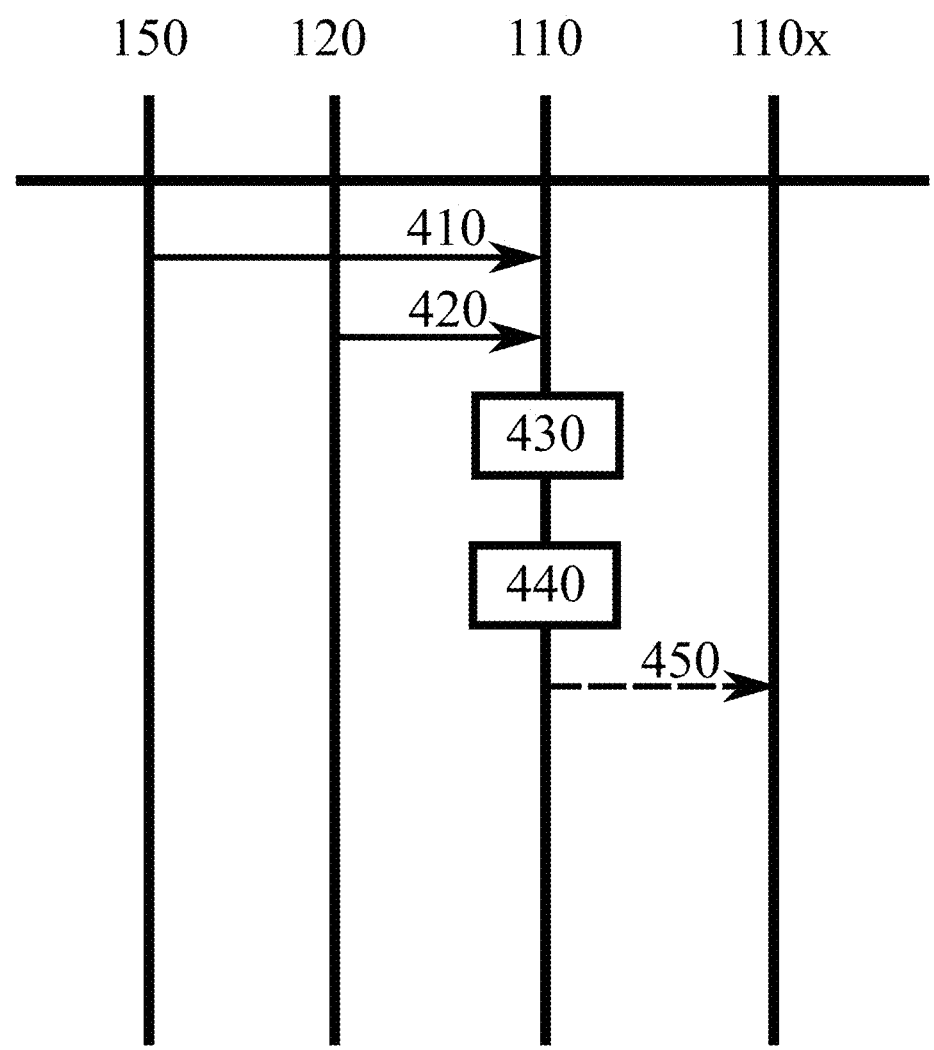
FIG. 4 illustrates signalling in accordance with at least some embodiments of the present invention.

FIG. 4 illustrates signalling in accordance with at least some embodiments of the present invention. Disposed on the vertical axes are, from left to right, satellite constellation 150, base station 120, device 110 and auxiliary device 110x. Satellite constellation 150, base station 120 and device 110 correspond to like elements described in connection with FIG. 1. Auxiliary device 110x may comprise a user device that is furnished with a larger screen than device 110, for example. For example, auxiliary device 110x may comprise a smartphone or tablet computer. Auxiliary device 110x may be paired with device 110, for example using the Bluetooth protocol.

In phase 410, device 110 obtains positioning information from satellite constellation 150. Device 110 may use the positioning information to determine where it is, and to determine a sunrise time and sunset time for the determined location.

In phase 420, device 110 obtains meteorological information from base station 120. For example, device 110 may request and responsively receive the meteorological information relevant to the determined location of device 110, for example, from a server that device 110 can reach via base station 120.

In phase 430, device 110 may determine the time of a dynamic event, based, for example, on the sunset time and/or the meteorological information, as described above. The dynamic event may correspond to a time when a user needs to start toward a predefined location, for example, to avoid darkness and/or adverse weather.

In phase 440, device 110 may provide an alert to the user, for example via a user interface, vibrator and/or speaker. In optional phase 450, the alert may be provided to the user via auxiliary device 110x.

Figure 5:
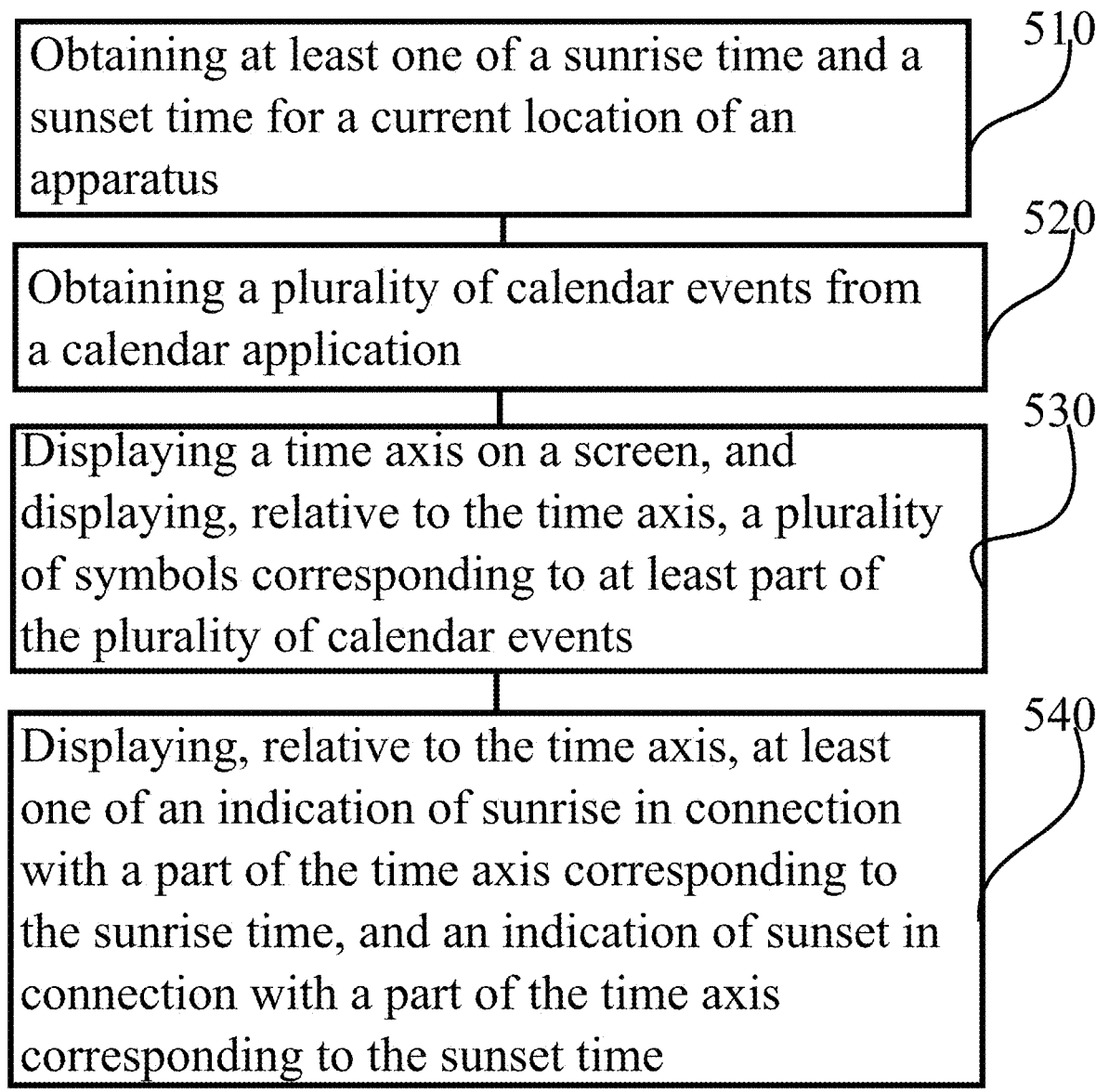
FIG. 5 is a flow graph of a method in accordance with at least some embodiments of the present invention.

FIG. 5 is a flow graph of a method in accordance with at least some embodiments of the present invention. The phases of the illustrated method may be performed in device 110, for example, or in a control device that is configured to control the functioning of device 110, when implanted therein.

Phase 510 comprises obtaining at least one of a sunrise time and a sunset time for a current location of an apparatus. Phase 520 comprises obtaining a plurality of calendar events from a calendar application. Phase 530 comprises displaying a time axis on a screen, and displaying, relative to the time axis, a plurality of symbols corresponding to at least part of the plurality of calendar events. Finally, phase 540 comprises displaying, relative to the time axis, at least one of an indication of sunrise in connection with a part of the time axis corresponding to the sunrise time, and an indication of sunset in connection with a part of the time axis corresponding to the sunset time.

Figure 6:
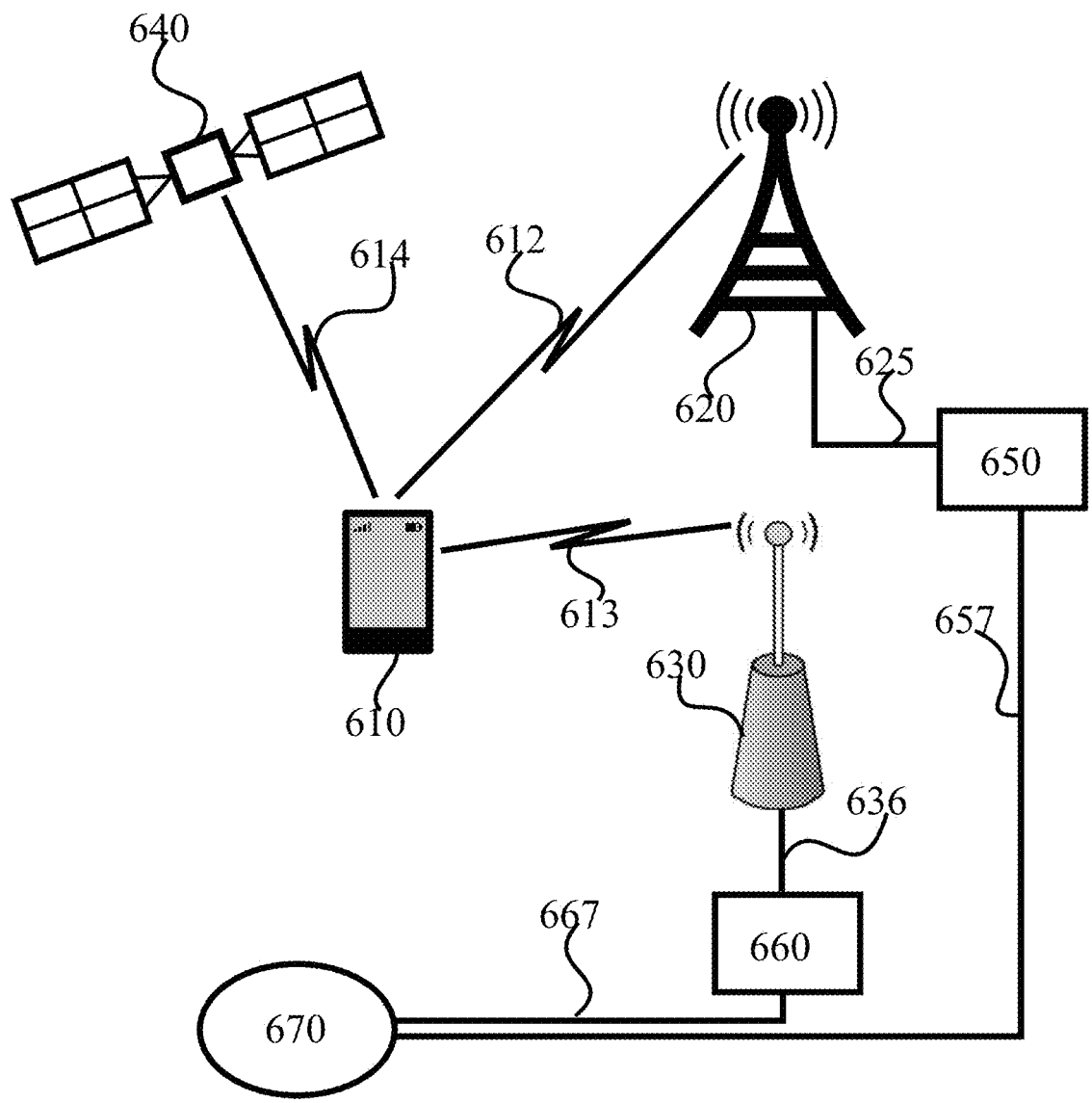
FIG. 6 illustrates an example system capable of supporting at least some embodiments of the present invention.

FIG. 6 illustrates an example system capable of supporting at least some embodiments of the present invention. In the example system of FIG. 6 is comprised device 610, which may comprise an embedded device, such as for example a smart watch, personal health monitor, cellular phone, smartphone or other suitable device.

Device 610 is in the example of FIG. 6 configured with a plurality of communication interfaces. A first communication interface enables device 610 to receive satellite positioning information from satellite constellation 640, via satellite link 614. Examples of suitable satellite positioning constellations include global positioning system, GPS, GLONASS, Beidou and the Galileo satellite positioning constellation.

A second communications interface enables device 610 to communicate with a cellular communications system, such as for example a wideband code division multiple access, WCDMA, or long term evolution, LTE, network. A cellular link 612 may be configured to convey information between device 610 and base station 620. The cellular link 612 may be configured in accordance with the same cellular communications standard that both device 610 and base station 620 both support. Base station 620 may be comprised in a cellular radio access network that comprises a plurality of base stations. Base station 620 may be arranged to communicate with core network node 650 via connection 625. Core network node 650 may comprise a switch, mobility management entity or gateway, for example. Core network node 650 may be arranged to communicate with a further network 670, such as for example the Internet, via connection 657.

A third communications interface enables device 610 to communicate with a non-cellular communications system, such as for example a wireless local area network, WLAN, Bluetooth or worldwide interoperability for microwave access, WiMAX, system. A further example is an inductive underwater communication interface. A non-cellular link 613 may be configured to convey information between device 610 and access point 630. The non-cellular link 613 may be configured in accordance with the same non-cellular technology that both device 610 and access point 630 both support. Access point 630 may be arranged to communicate with gateway 660 via connection 636. Gateway 660 may be arranged to communicate with further network 670 via connection 667. Each of connections 625, 657, 636 and 667 may be wire-line or at least in part wireless. Not all of these connections need to be of the same type. In certain embodiments, at least one of the first communications interface, the second communications interface and the third communications interface is absent.

A fourth communications link may enable device 610 to communicate with a mobile device. For example, a low-power wireless interface may enable communication with a mobile device where device 610 lacks cellular capability and a mobile device distinct from device 610 has cellular capability. An example of a low-power wireless interface is Bluetooth-low energy, BLE, or Bluetooth Smart.

In use, device 610 may use satellite positioning information from satellite constellation 640 to determine a geo-location of device 610. The geo-location may be determined in terms of coordinates, for example. Device 610 may be configured to present, on a display that may be comprised in device 610, a map with the determined geo-location of device 610 presented thereon. For example, device 610 may display a street or feature map of the surroundings, with a symbol denoting the current location of device 610 on the map. Providing a map with a current location of device 610 indicated thereon, and/or providing navigation instructions, may be referred to as a mapping service.

In some embodiments, device 610 may provide connectivity services to a user, such as for example web browsing, instant messaging and/or email. Device 610 may be configured to provide connectivity service to its functions and/or applications, in some embodiments including enabling remote access to these functions and/or services over a network, such as the Internet. Thus device 610 may be trackable over the Internet, for example. Such connectivity services may be run over bidirectional communication links, such as for example cellular link 612 and/or non-cellular link 613. In general, device 610 may provide a service, such as for example a mapping service or a connectivity service, to a user via a display.

Device 610 may comprise two or more processing units. The two or more processing units may each comprise a processing core. Each processing unit may comprise one or multiple uniformal or heterogeneous processor cores and/or different volatile and non-volatile memories. For example, device 610 may comprise a microprocessor with at least one processing core, and a microcontroller with at least one processing core. The processing cores needn't be of the same type, for example, a processing core in a microcontroller may have more limited processing capability and/or a less capable memory technology than a processing core comprised in a microprocessor. In some embodiments, a single integrated circuit comprises two processing cores, a first one of which has lesser processing capability and consumes less power, and a second one of which has greater processing capability and consumes more power. In general a first one of the two processing units may have lesser processing capability and consume less power, and a second one of the two processing units may have greater processing capability and consume more power. Each of the processing units may be enabled to control the display of device 610. The more capable processing unit may be configured to provide a richer visual experience via the display. The less capable processing unit may be configured to provide a reduced visual experience via the display. An example of a reduced visual experience is a reduced colour display mode, as opposed to a rich colour display mode. An another example of a reduced visual experience is one which is black-and-white. An example of a richer visual experience is one which uses colours. Colours may be represented with 16 bits or 24 bits, for example.

Each of the two processing units may comprise a display interface configured to communicate toward the display. For example, where the processing units comprise a microprocessor and a microcontroller, the microprocessor may comprise transceiver circuitry coupled to at least one metallic pin under the microprocessor, the at least one metallic pin being electrically coupled to an input interface of a display control device. The display control device, which may be comprised in the display, is configured to cause the display to display information in dependence of electrical signals received in the display control device. Likewise the microcontroller in this example may comprise transceiver circuitry coupled to at least one metallic pin under the microcontroller, the at least one metallic pin being electrically coupled to an input interface of a display control device. The display control device may comprise two input interfaces, one coupled to each of the two processing units, or alternatively the display control device may comprise a single input interface into which both processing units are enabled to provide inputs via their respective display interfaces. Thus a display interface in a processing unit may comprise transceiver circuitry enabling the processing unit to transmit electrical signals toward the display.

One of the processing units, for example the less capable or the more capable one, may be configured to control, at least in part, the other processing unit. For example, the less capable processing unit, for example a less capable processing core, may be enabled to cause the more capable processing unit, for example a more capable processing core, to transition into and from a hibernating state. These transitions may be caused to occur by signalling via an inter-processing unit interface, such as for example an inter-core interface.

When transitioning into a hibernating state from an active state, the transitioning processing unit may store its context, at least in part, into a memory, such as for example a pseudostatic random access memory, PSRAM, SRAM, FLASH or ferroelectric RAM, FRAM. The context may comprise, for example, content of registers and/or addressing. When transitioning from a hibernated state using a context stored in memory, a processing unit may resume processing faster and/or from a position where the processing unit was when it was hibernated. This way, a delay experienced by a user may be minimised. Alternative terms occasionally used for context include state and image. In a hibernating state, a clock frequency of the processing unit and/or an associated memory may be set to zero, meaning the processing unit is powered off and does not consume energy. Circuitry configured to provide an operating voltage to at least one processing unit may comprise a power management integrated circuit, PMIC, for example. Since device 610 comprises another processing unit, the hibernated processing unit may be powered completely off while maintaining usability of device 610.

When transitioning from a hibernated state to an active state, the transitioning processing unit may have its clock frequency set to a non-zero value. The transitioning processing unit may read a context from a memory, wherein the context may comprise a previously stored context, for example a context stored in connection with transitioning into the hibernated state, or the context may comprise a default state or context of the processing unit stored into the memory in the factory. The memory may comprise pseudostatic random access memory, SRAM, FLASH and/or FRAM, for example. The memory used by the processing unit transitioning to and from the hibernated state may comprise DDR memory, for example.

With one processing unit in a hibernation state, the non-hibernated processing unit may control device 610. For example, the non-hibernated processing unit may control the display via the display interface comprised in the non-hibernated processing unit. For example, where a less capable processing unit has caused a more capable processing unit to transition to the hibernated state, the less capable processing unit may provide a reduced user experience, for example, via at least in part, the display. An example of a reduced user experience is a mapping experience with a reduced visual experience comprising a black-and-white rendering of the mapping service. The reduced experience may be sufficient for the user to obtain a benefit from it, with the advantage that battery power is conserved by hibernating the more capable processing unit. In some embodiments, a more capable processing unit, such as a microprocessor, may consume a milliampere of current when in a non-hibernated low-power state, while a less capable processing unit, such as a microcontroller, may consume only a microampere when in a non-hibernated low-power state. In non-hibernated states current consumption of processing units may be modified by setting an operating clock frequency to a value between a maximum clock frequency and a minimum non-zero clock frequency. In at least some embodiments, processing units, for example less capable processing units, may be configurable to power down for short periods, such as 10 or 15 microseconds, before being awakened. In the context of this document, this is not referred to as a hibernated state but an active low-power configuration. An average clock frequency calculated over a few such periods and the intervening active periods is a positive non-zero value. A more capable processing unit may be enabled to run the Android operating system, for example.

Triggering events for causing a processing unit to transition to the hibernated state include a user indicating a non-reduced experience is no longer needed, a communication interface of the processing unit no longer being needed and device 610 not having been used for a predetermined length of time. An example indication that a non-reduced experience is no longer needed is where the user deactivates a full version of an application, such as for example a mapping application. Triggering events for causing a processing unit to transition from the hibernated state to an active state may include a user indicating a non-reduced experience is needed, a communication interface of the processing unit being requested and device 610 being interacted with after a period of inactivity. Alternatively or additionally, external events may be configured as triggering events, such as, for example, events based on sensors comprised in device 610. An example of such an external event is a clock-based event which is configured to occur at a preconfigured time of day, such as an alarm clock function, for example. In at least some embodiments, the non-reduced experience comprises use of a graphics mode the non-hibernated processing unit cannot support, but the hibernated processing unit can support. A graphics mode may comprise a combination of a resolution, colour depth and/or refresh rate, for example.

In some embodiments, a user need or user request for the non-reduced experience may be predicted. Such predicting may be based at least in part on a usage pattern of the user, where the user has tended to perform a certain action in the reduced experience before requesting the non-reduced experience. In this case, responsive to a determination the user performs the certain action in the reduced experience, the non-reduced mode may be triggered.

If the processing units reside in separate devices or housings, such as a wrist-top computer and a handheld or fixedly mounted display device for example, a bus may be implemented in a wireless fashion by using a wireless communication protocol. Radio transceiver units functionally connected to their respective processing units may thus perform the function of the bus, forming a personal area network, PAN. The wireless communication protocol may be one used for communication between computers, and/or between any remote sensors, such as a Bluetooth LE or the proprietary ANT+ protocol. These are using direct-sequence spread spectrum, DSSS, modulation techniques and an adaptive isochronous network configuration, respectively. Enabling descriptions of necessary hardware for various implementations for wireless links are available, for example, from the Texas Instrument®'s handbook "Wireless Connectivity" which includes IC circuits and related hardware configurations for protocols working in sub-1- and 2.4-GHz frequency bands, such as ANT™, Bluetooth®, Bluetooth® low energy, RFID/NFC, PurePath™ Wireless audio, ZigBee®, IEEE 802.15.4, ZigBee RF4CE, 6LoW-PAN, Wi-Fi®.

In connection with hibernation, the PAN may be kept in operation by the non-hibernated processing unit, such that when hibernation ends, the processing unit leaving the hibernated mode may have access to the PAN without needing to re-establish it.

In some embodiments, microphone data is used in determining, in a first processor, whether to trigger a second processor from hibernation. The first processor may be less capable and consume less energy than the second processor. The first processor may comprise a microcontroller and the second processor may comprise a microprocessor, for example. The microphone data may be compared to reference data and/or preprocessed to identify in the microphone data features enabling determination whether a spoken instructions has been uttered and recorded into the microphone data. Alternatively or in addition to a spoken instruction, an auditory control signal, such as a fire alarm or beep signal, may be searched in the microphone data.

Responsive to the spoken instruction and/or auditory control signal being detected, by the first processor, in the microphone data, the first processor may start the second processor. In some embodiments, the first processor starts the second processor into a state that the first processor selects in dependence of which spoken instruction and/or auditory control signal was in the microphone data. Thus, for example, where the spoken instruction identifies a web search engine, the second processor may be started up into a user interface of this particular web search engine. As a further example, where the auditory control signal is a fire alarm, the second processor may be started into a user interface of an application that provides emergency guidance to the user. Selecting the initial state for the second processor already in the first processor saves time compared to the case where the user or second processor itself selects the state.

In cases where a microphone is comprised in the apparatus, the microphone may in particular be enclosed inside a waterproof casing. While such a casing may prevent high-quality microphone data from being generated, it may allow for microphone quality to be generated that is of sufficient quality for the first processor to determine, whether the spoken instruction and/or auditory control signal is present.

In some embodiments, the first processor is configured to process a notification that arrives in the apparatus, and to decide whether the second processor is needed to handle the notification. The notification may relate to a multimedia message or incoming video call, for example. The notification may relate to a software update presented to the apparatus, wherein the first processor may cause the second processor to leave the hibernating state to handle the notification. The first processor may select, in dependence of the notification, an initial state into which the second processor starts from the hibernated state. For a duration of a software update, the second processor may cause the first processor to transition into a hibernated state.

In general, an instruction from outside the apparatus may be received in the apparatus, and the first processor may responsively cause the second processor to leave the hibernation state. The instruction from outside the apparatus may comprise, for example, the notification, the spoken instruction or the auditory control signal.

Figure 7:
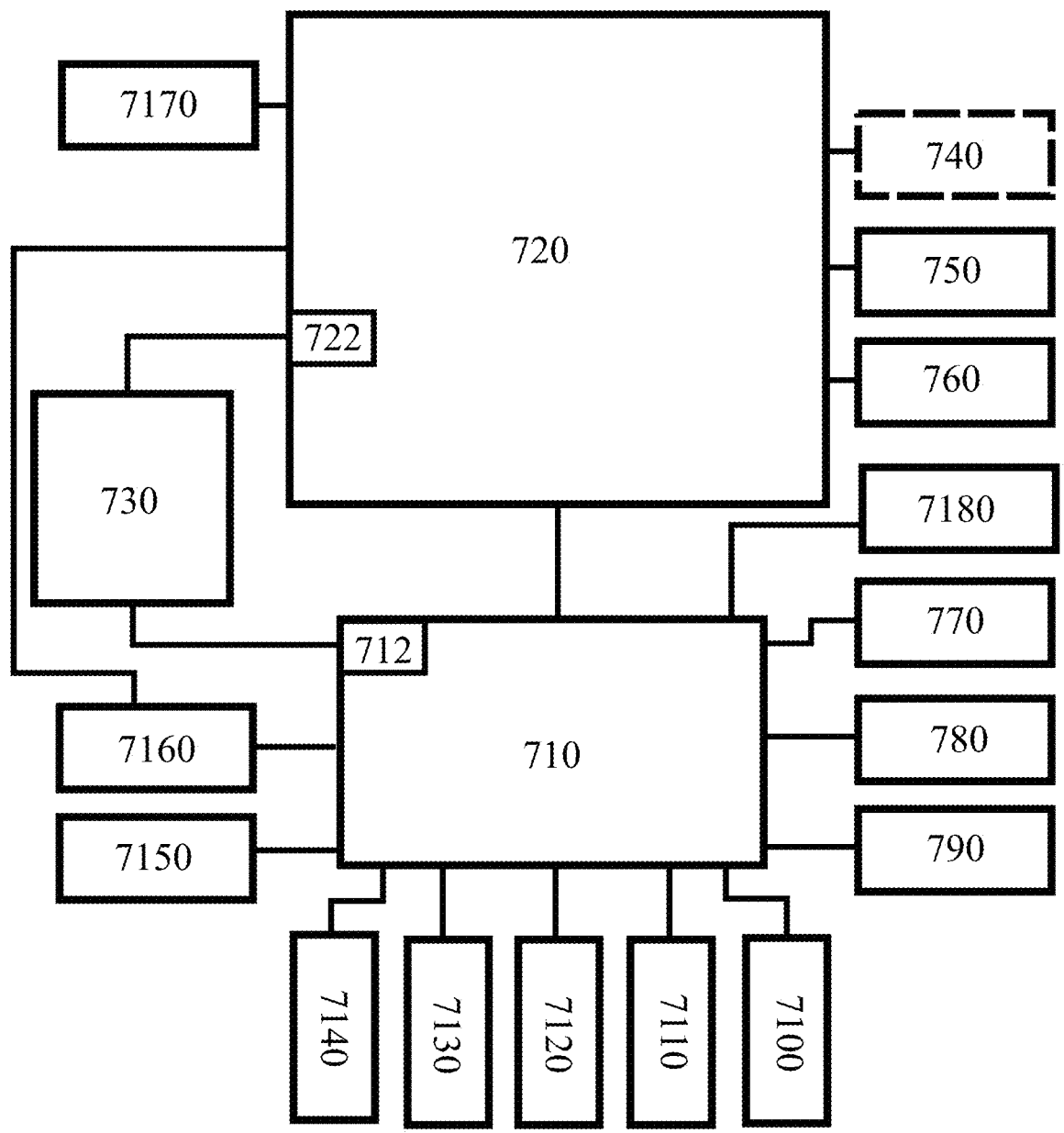
FIG. 7 illustrates a first example apparatus capable of supporting at least some embodiments of the present invention.

FIG. 7 illustrates a first example apparatus capable of supporting at least some embodiments of the present invention. The illustrated apparatus comprises a microcontroller 710 and a microprocessor 720. Microcontroller 710 may comprise, for example, a Silabs EMF32 or a Renesas RL78 microcontroller, or similar. Microprocessor 720 may comprise, for example, a Qualcomm Snapdragon processor or an ARM Cortex-based processor. Microcontroller 710 and microprocessor 720 are in the example of FIG. 7 communicatively coupled with an inter-core interface, which may comprise, for example, a serial or a parallel communication interface. More generally an interface disposed between microcontroller 710 and microprocessor 720 may be considered an inter-processing unit interface.

Microcontroller 710 is communicatively coupled, in the illustrated example, with a buzzer 770, a universal serial bus, USB, interface 780, a pressure sensor 790, an acceleration sensor 7100, a gyroscope 7110, a magnetometer 7120, satellite positioning circuitry 7130, a Bluetooth interface 7140, user interface buttons 7150 and a touch interface 7160. Pressure sensor 790 may comprise an atmospheric pressure sensor, for example.

Microprocessor 720 is communicatively coupled with an optional cellular interface 740, a non-cellular interface 750 and a USB interface 760. Microprocessor 720 is further communicatively coupled, via microprocessor display interface 722, with display 730. Microcontroller 710 is likewise communicatively coupled, via microcontroller display interface 712, with display 730. Microprocessor display interface 722 may comprise communication circuitry comprised in microprocessor 720. Microcontroller display interface 712 may comprise communication circuitry comprised in microcontroller 710.

Microcontroller 710 may be configured to determine whether triggering events occur, wherein responsive to the triggering events microcontroller 710 may be configured to cause microprocessor 720 to transition into and out of the hibernating state described above. When microprocessor 720 is in the hibernating state, microcontroller 710 may control display 730 via microcontroller display interface 722. Microcontroller 710 may thus provide, when microprocessor 720 is hibernated, for example, a reduced experience to a user via display 730.

Responsive to a triggering event, microcontroller 710 may cause microprocessor 720 to transition from the hibernated state to an active state. For example, where a user indicates, for example via buttons 7150, that he wishes to originate a cellular communication connection, microcontroller 710 may cause microprocessor 720 to transition to an active state since cellular interface 740 is controllable by microprocessor 720, but, in the example of FIG. 7, not directly usable by microcontroller 710. In some embodiments, when microprocessor 720 is hibernated, also cellular interface 740 is in a hibernated state. Cellular interface 740 may comprise an electrical interface to a cellular transceiver, for example. Cellular interface 740 may comprise control circuitry of a cellular transceiver.

In various embodiments, at least two elements illustrated in FIG. 7 may be integrated on a same integrated circuit. For example, microprocessor 720 and microcontroller 710 may be disposed as processing cores in a same integrated circuit. Where this is the case, for example, cellular interface 740 may be a cellular interface of this integrated circuit, comprised in this integrated circuit, with cellular interface 740 being controllable by microprocessor 720 but not by microcontroller 710. In other words, individual hardware features of the integrated circuit may be controllable by one of microcontroller 710 and microprocessor 720, but not both. On the other hand, some hardware features may be controllable by either processing unit. For example, USB interface 760 and USB interface 780 may be in such an integrated embodiment one and the same USB interface of the integrated circuit, controllable by either processing core.

In FIG. 7 are further illustrated memory 7170 and memory 7180. Memory 7170 is used by microprocessor 720, and may be based on a DDR memory technology, such as for example DDR2 or DDR3, for example. Memory 7180 is used by microcontroller 710, and may be based on SRAM technology, for example.

Figure 8:
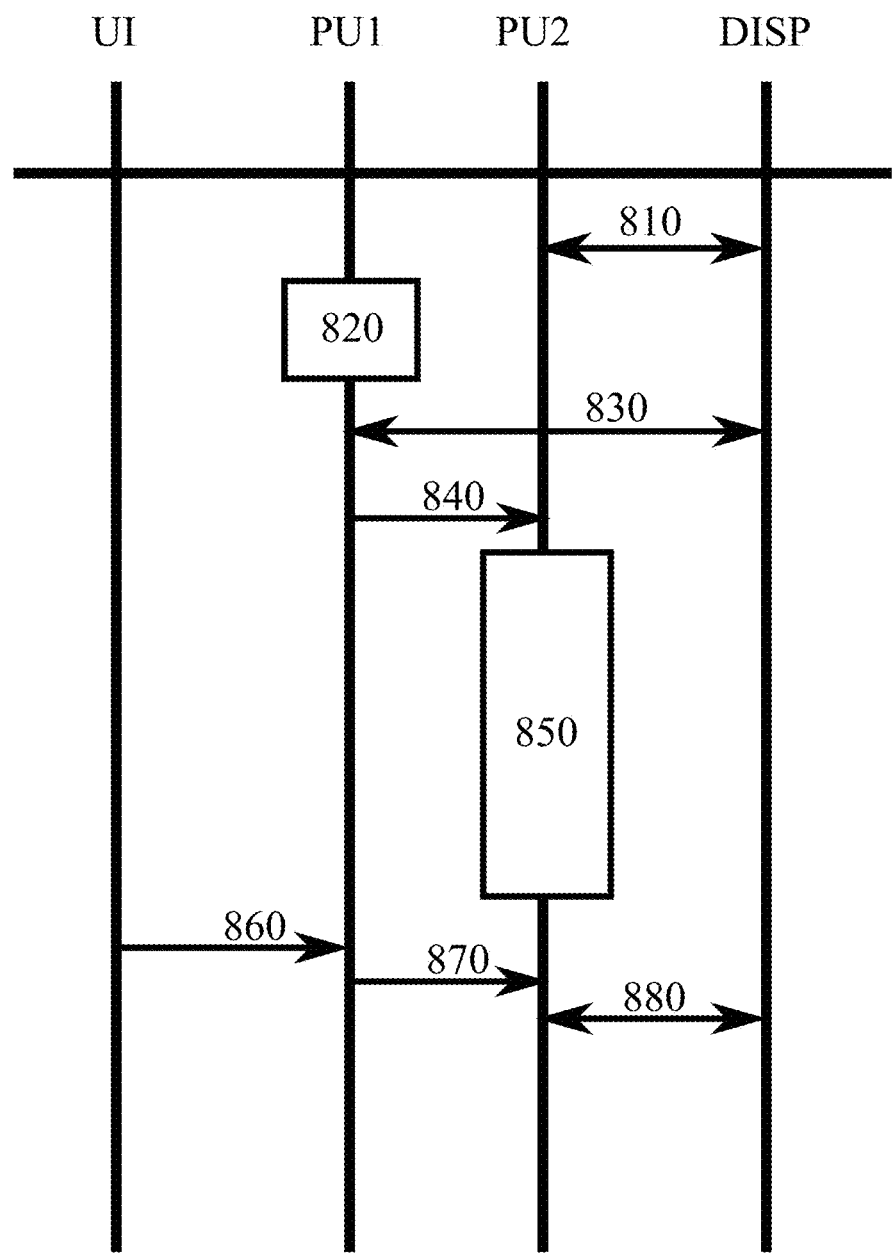
FIG. 8 illustrates signalling in accordance with at least some embodiments of the present invention.

FIG. 8 illustrates signalling in accordance with at least some embodiments of the present invention. On the vertical axes are disposed, from left to right, user interface UI, processing unit PU1, processing unit 2 PU2, and finally display DISP. Time advances from the top toward the bottom. Processing unit 2 may have higher processing capability, and be associated with a higher current consumption, than processing unit 1.

In phase 810, processing unit 2, which may comprise a processing core, controls the display. For example, processing unit 2 may run an application and provide to the display instructions to display information reflective of the state of the application.

In phase 820, processing unit 1 determines that a triggering event occurs, the triggering event being associated with a transition of processing unit 2 from an active state to a hibernated state. Processing unit 1 may determine an occurrence of a triggering event by receiving from processing unit 2 an indication that a task performed by processing unit 2 has been completed, for example. As discussed above, the hibernating state may comprise that a clock frequency of processing unit 2 is set to zero. Responsive to the determination of phase 820, processing unit 1 assumes control of the display in phase 830, and causes processing unit 2 to transition to the hibernating state in phase 840. Subsequently, in phase 850, processing unit 2 is in the hibernated state. When processing unit 2 is in the hibernated state, battery resources of the device may be depleted at a reduced rate. In some embodiments, phase 830 may start at the same time as phase 840 occurs, or phase 840 may take place before phase 830 starts.

In phase 860, a user interacts with the user interface UI in such a way that processing unit 1 determines a triggering event to transition processing unit 2 from the hibernated state to an active state. For example, the user may trigger a web browser application that requires a connectivity capability that only processing unit 2 can provide. Responsively, in phase 870 processing unit 1 causes processing unit 2 to wake up from the hibernating state. As a response, processing unit 2 may read a state from a memory and wake up to this state, and assume control of the display, which is illustrated as phase 880.

Figure 9:
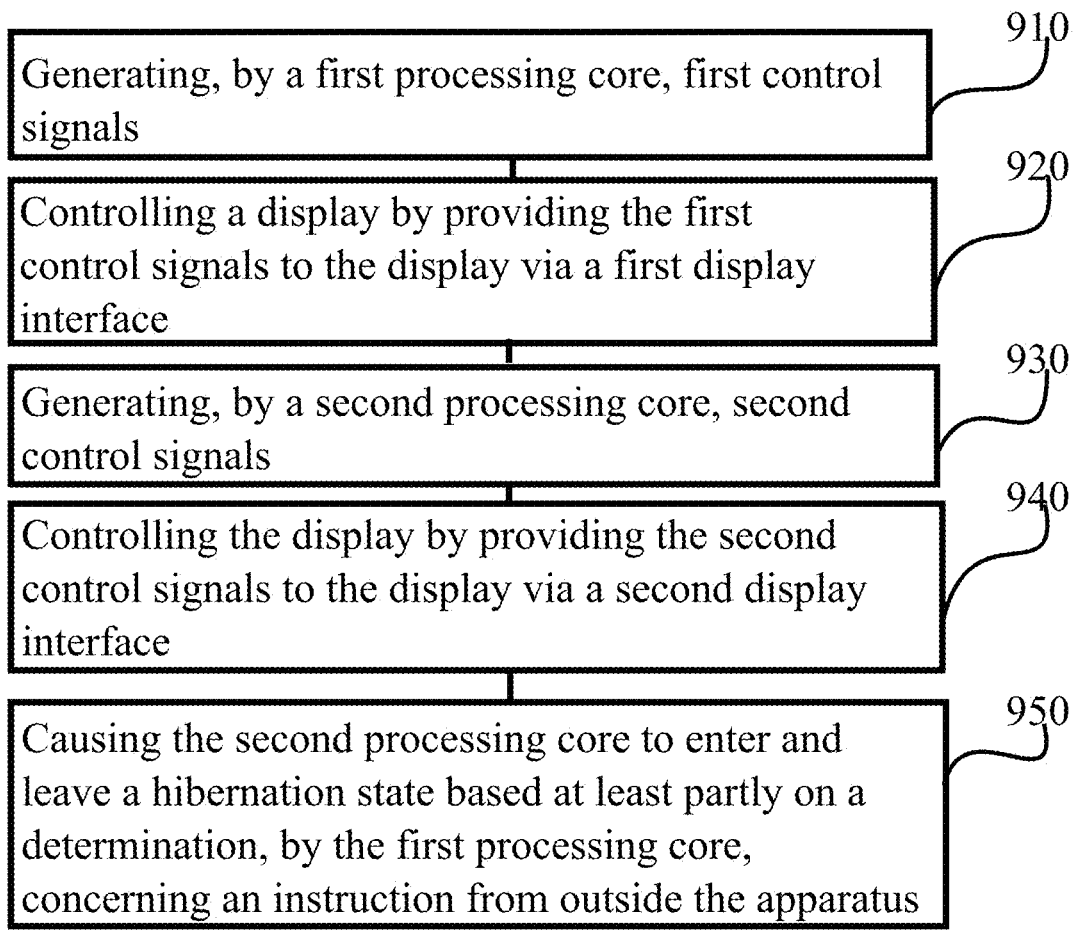
FIG. 9 is a first flow chart of a first method in accordance with at least some embodiments of the present invention.

FIG. 9 is a first flow chart of a first method in accordance with at least some embodiments of the present invention. The phases of the illustrated method may be performed in device 110 of FIG. 6, or in the apparatus of FIG. 7, for example.

Phase 910 comprises generating, by a first processing core, first control signals. Phase 920 comprises controlling a display by providing the first control signals to the display via a first display interface. Phase 930 comprises generating, by a second processing core, second control signals. Phase 940 comprises controlling the display by providing the second control signals to the display via a second display interface. Finally, phase 950 comprises causing the second processing core to enter and leave a hibernation state based at least partly on a determination, by the first processing core, concerning an instruction from outside the apparatus.

Figure 10:
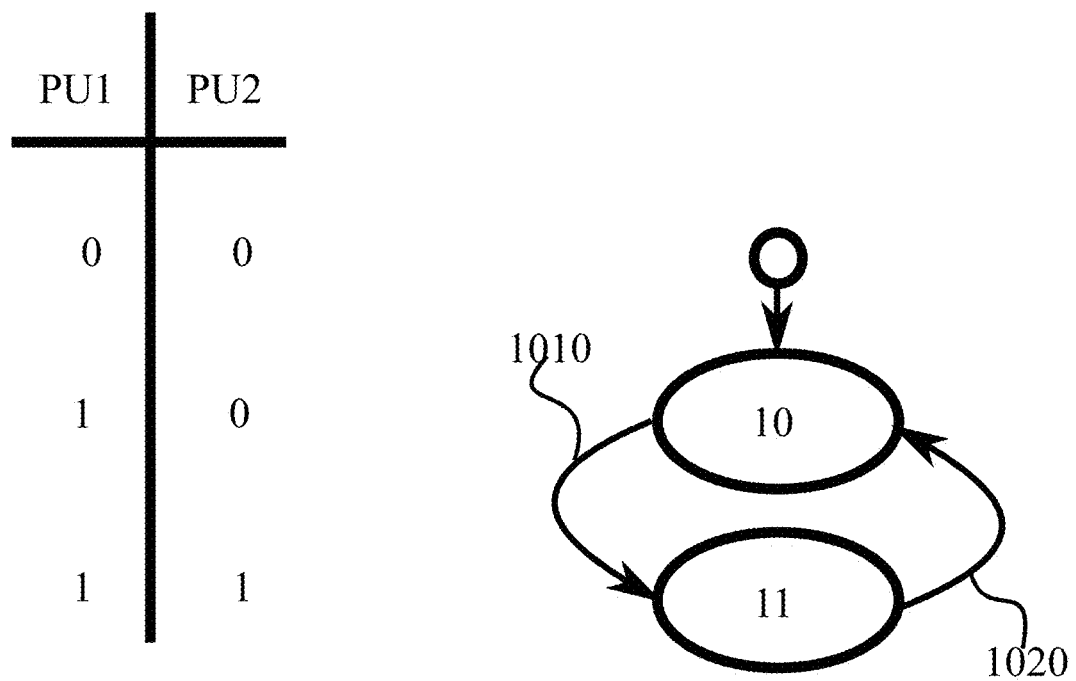
FIG. 10 is a state transition diagram in accordance with at least some embodiments of the present invention

FIG. 10 is a state transition diagram in accordance with at least some embodiments of the present invention.

PU1 corresponds to processing unit 1, for example, a less capable processing unit. PU2 corresponds to processing unit 2, for example, a more capable processing unit. These units may be similar to those in discussed in connection with FIG. 8, for example. In an initial state, the device comprising PU1 and PU2 is in an inactive state, with zeros indicating the states of both PU1 and PU2. PU1 and PU2 are both switched off.

Starting from the initial power-off state, first PU1 is powered up, indicated as a "1" in the state of PU1, while PU2 remains in an off state, denoted by zero. Thus the compound state is "10", corresponding to a case where PU1 is active and PU2 is not. In this state, the device may offer a reduced experience to a user and consume relatively little current from battery reserves.

In addition to, or alternatively to, a power-off state PU1 and/or PU2 may have an intermediate low-power state from which it may be transitioned to an active state faster than from a complete power-off state. For example, a processing unit may be set to such an intermediate low-power state before being set to a power-off state. In case the processing unit is needed soon afterward, it may be caused to transition back to the power-up state. If no need for the processing unit is identified within a preconfigured time, the processing unit may be caused to transition from the intermediate low-power state to a power-off state.

Arrow 1010 denotes a transition from state "10" to state "11", in other words, a transition where PU2 is transitioned from the hibernated state to an active state, for example, a state where its clock frequency is non-zero. PU1 may cause the transition denoted by arrow 1010 to occur, for example, responsive to a triggering event. In state "11", the device may be able to offer a richer experience, at the cost of faster battery power consumption.

Arrow 1020 denotes a transition from state "11" to state "10", in other words, a transition where PU2 is transitioned from an active state to the hibernated state. PU1 may cause the transition denoted by arrow 1020 to occur, for example, responsive to a triggering event.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in providing an efficient man-machine interface and secure roaming in nature.

ACRONYMS LIST

OLED Organic light-emitting diode
GPS Global positioning system
LTE Long term evolution
UI User interface
WCDMA Wideband code division multiple access
WiMAX Worldwide interoperability for microwave access
WLAN Wireless local area network

The invention claimed is:

1. An apparatus comprising a low capability processing device and a higher capability processing device, at least one memory including computer program code, the at least one memory and the computer program code being configured to, with the low capability processing device and the higher capability processing device, cause the apparatus at least to predict, based at least in part on a specific calendar event in a calendar application, a need for a rich media interface and to trigger startup of the higher capability processing device from among the low capability processing device and the higher capability processing device in the apparatus at a time that is selected based on the prediction, wherein the specific calendar event comprises an indication relating to an application used to process the specific calendar event, the apparatus being configured to trigger the startup of the higher capability processing device at a time which precedes a start time of the specific calendar event by a lag which equals a sum of a boot time of the higher capability processing device and a starting delay of the application in the higher capability processing device.

2. The apparatus according to claim 1, wherein the apparatus is further configured to cause the higher capability processing device to enter and leave a hibernation state based at least partly on a determination, by the low capability processing device, concerning an instruction from outside the apparatus.

3. The apparatus according to claim 1, wherein the higher capability processing device and the low capability processing device each comprise processing cores.

4. The apparatus according to claim 1, wherein the higher capability processing core and the low capability processing device are each electrically interfaced with a shared random access memory.

5. The apparatus according to claim 1, wherein the apparatus is configured to obtain a plurality of calendar events occurring during a same day from the calendar application, to display a time axis on a screen, and to display, relative to the time axis at parts of the time axis that are selected based on scheduled times of day of the calendar events, a plurality of symbols, the symbols corresponding to at least two of the plurality of calendar events.

6. The apparatus according to claim 1, wherein the low capacity processing device is unable to render the rich media interface.

7. The apparatus according to claim 1, wherein the low capability processing device is configured to cause the higher capability processing device to hibernate responsive to a determination that a user interface type not supported by the low capability processing device is no longer requested.

8. The apparatus according to claim 1, wherein the apparatus comprises a smart watch.

9. The apparatus according to claim 1, wherein the apparatus comprises a handheld communications device.

10. The apparatus according to claim 1, wherein the apparatus comprises a personal fitness tracker.

11. The apparatus as claimed in claim 1, wherein the apparatus comprises an at least partially retractable, rotatable hardware element, and the apparatus is configured to be operable by a user by interacting with the rotatable hardware element.

12. A method comprising:
causing an apparatus to predict, based at least in part on a specific calendar event in a calendar application, a need for a rich media interface, and
triggering startup of a higher capability processing device from among a low capability processing device and the higher capability processing device in the apparatus at a time that is selected based on the prediction,
wherein the specific calendar event comprises an indication relating to an application used to process the specific calendar event, the method comprising triggering the startup of the higher capability processing device at a time which precedes a start time of the specific calendar event by a lag which equals a sum of a boot time of the higher capability processing device and a starting delay of the application in the higher capability processing device.

13. The method according to claim 12, further comprising causing the higher capability processing device to enter and leave a hibernation state based at least partly on a determination, by the low capability processing device, concerning an instruction from outside the apparatus.

14. The method according to claim 12, wherein the higher capability processing device and the low capability processing device each comprise processing cores.

15. The method according to claim 12, wherein the higher capability processing core and the low capability processing device are each electrically interfaced with a shared random access memory.

16. The method according to claim 12, further comprising obtaining a plurality of calendar events occurring during a same day from the calendar application, displaying a time axis on a screen, and displaying, relative to the time axis at parts of the time axis that are selected based on scheduled times of day of the calendar events, a plurality of symbols, the symbols corresponding to at least two of the plurality of calendar events.

17. The method according to claim 12, wherein the low capacity processing device is unable to render the rich media mode.

18. The method according to claim 12, further comprising causing, by the low capability processing device, the higher capability processing device to hibernate responsive to a determination that a user interface type not supported by the low capability processing device is no longer requested.

19. A non-transitory computer readable medium having stored thereon a set of computer readable instructions that, when executed by at least one processor, cause an apparatus to at least:
cause the apparatus to predict, based at least in part on specific calendar event in a calendar application, a need for a rich media interface, and
trigger startup of a higher capability processing device from among a low capability processing device and the higher capability processing device in the apparatus at a time that is selected based on the prediction,
wherein the specific calendar event comprises an indication relating to an application used to process the specific calendar event, wherein the startup of the higher capability processing device is triggered at a time which precedes a start time of the specific calendar event by a lag which equals a sum of a boot time of the higher capability processing device and a starting delay of the application in the higher capability processing device.

* * * * *